United States Patent
Phan et al.

(10) Patent No.: US 11,221,419 B1
(45) Date of Patent: Jan. 11, 2022

(54) HIGH INTEGRITY PARTIAL ALMOST-FIX SOLUTION

(71) Applicant: Rockwell Collins, Inc., Cedar Rapids, IA (US)

(72) Inventors: Huan T. Phan, Cedar Rapids, IA (US); Gary A. McGraw, Cedar Rapids, IA (US); Michael J. Armatys, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/369,567

(22) Filed: Mar. 29, 2019

Related U.S. Application Data (63) Continuation of application No. 15/065,260, filed on Mar. 9, 2016, now Pat. No. 10,274,606.

(51) Int. Cl.
  *G01S 19/41* (2010.01)
  *G01S 19/55* (2010.01)
  (Continued)

(52) U.S. Cl.
  CPC .............. *G01S 19/41* (2013.01); *G01S 19/44* (2013.01); *G01S 19/55* (2013.01); *G01S 19/07* (2013.01); *G01S 19/15* (2013.01); *G01S 19/40* (2013.01)

(58) Field of Classification Search
  CPC .......... G01S 19/04; G01S 19/07; G01S 19/15; G01S 19/40; G01S 19/41; G01S 19/43;
  (Continued)

(56) References Cited

U.S. PATENT DOCUMENTS

| | | | |
|---|---|---|---|
| 829,582 A | 8/1906 | Gayer | |
| 6,466,846 B2 * | 10/2002 | Maynard | G01S 5/0009 342/357.31 |

(Continued)

OTHER PUBLICATIONS

Joosten, Peter et al., "LAMBDA: FAQs", GPS Solutions, copyright Springer-Verlag 2002, pp. 6:109-6:114, published online Oct. 11, 2002, DOI 10.1007/s10291-002-00048.

(Continued)

*Primary Examiner* — Chuong P Nguyen
(74) *Attorney, Agent, or Firm* — Suiter Swantz pc llo (57) ABSTRACT

A system and related method for determining precision navigation solutions is disclosed. The system decorrelates GPS carrier-phase ambiguities derived from multiple-source GPS information via Least-squares AMBiguity Decorrelation Adjustment (LAMBDA) algorithms. The set of decorrelated floating-point ambiguities is used to compute protection levels and the probability of almost fix (PAF), or the probability that the partial almost-fix solution corresponding to the decorrelated ambiguities is within the region of correctly-fixed or low-error almost-fixed ambiguities. While the PAF remains below threshold and the protection levels remain below alert levels, the optimal navigation solution (floating-point, partial almost-fix, or fully fixed) is generated by fixing the decorrelated ambiguities are one at a time in the LAMBDA domain and replacing the appropriate carrier-phase ambiguities with the corresponding fixed ambiguities, reverting to the last solution if PAF reaches the threshold or if protection levels reach the alert levels.

7 Claims, 9 Drawing Sheets

(51) Int. Cl.
*G01S 19/44* (2010.01)
*G01S 19/07* (2010.01)
*G01S 19/15* (2010.01)
*G01S 19/40* (2010.01)

(58) Field of Classification Search
CPC .......... G01S 19/44; G01S 19/47; G01S 19/48; G01S 19/49; G01S 19/53; G01S 19/54; G01S 19/55
USPC .............. 342/357.24, 357.23, 357.3, 357.32, 342/357.36, 357.38, 357.44, 357.53
See application file for complete search history.

(56) References Cited

U.S. PATENT DOCUMENTS

| | | | | |
|---|---|---|---|---|
| 6,847,893 B1* | 1/2005 | Lupash | ................ | G01S 19/20 340/970 |
| 7,538,721 B2 | 5/2009 | Vollath et al. | | |
| 7,692,578 B2* | 4/2010 | Vollath | ................ | G01S 19/44 342/357.27 |
| 7,768,451 B2* | 8/2010 | Wu | ................ | G01S 19/04 342/357.23 |
| 7,961,143 B2* | 6/2011 | Dai | ................ | G01S 19/44 342/357.27 |
| 8,035,552 B2 | 10/2011 | Dai et al. | | |
| 8,368,591 B2 | 2/2013 | Talbot et al. | | |
| 8,542,146 B2* | 9/2013 | Vollath | ................ | G01S 19/44 342/357.27 |
| 8,614,642 B2 | 12/2013 | Talbot et al. | | |
| 8,717,237 B2 | 5/2014 | Vollath | | |
| 8,830,121 B2 | 9/2014 | Vollath | | |
| 8,898,011 B2* | 11/2014 | Peck | ................ | G01S 19/20 701/469 |
| 10,222,483 B2* | 3/2019 | Dai | ................ | G01S 19/32 |
| 10,379,225 B2* | 8/2019 | Dai | ................ | G01S 19/44 |
| 10,802,160 B2* | 10/2020 | Dai | ................ | G01S 19/44 |
| 10,809,391 B2* | 10/2020 | Lie | ................ | G01S 19/48 |
| 2012/0286991 A1 | 11/2012 | Chen et al. | | |
| 2013/0069822 A1 | 3/2013 | Wu et al. | | |
| 2016/0077214 A1* | 3/2016 | Xianglin | ................ | G01S 19/073 342/357.27 |
| 2020/0257002 A1* | 8/2020 | Henkel | ................ | G01S 19/04 |

OTHER PUBLICATIONS

Khanafseh, Samer et al., "A New Approach for Calculating Position Domain Integrity Risk for Cycle Resolution in Carrier Phase Navigation Systems", 1-4244-1537-3/08, copyright 2008 IEEE, pp. 583-591.

Teunissen, P.J.G., "GNSS Ambiguity Bootstrapping: Theory and Application", Proceedings of KIS2001, Jun. 5-8, 2001, pp. 246-254, Banff, Canada, University of Calgary.

Wu, Shuwu et al., "Geometry Extra-Redundant Almost Fixed Solutions: A High Integrity Approach for Carrier Phase Ambiguity Resolution for High Accuracy Relative Navigation", 1-4244-1537-3/08, copyright 2008 IEEE, pp. 568-582.

\* cited by examiner

202 — Receiving GPS information from at least two GPS sources, the at least two GPS sources corresponding to one or more common GPS satellites

204 — Generating, based on the received GPS information, at least one floating-point navigation solution including a first plurality of n first floating-point ambiguities associated with a first domain

206 — Generating a second plurality of n second floating-point ambiguities associated with a second domain, each second floating-point ambiguity corresponding to a first floating-point ambiguity of the first plurality, by decorrelating the n first floating-point ambiguities

208 — Defining at least one subset of the second plurality of n second floating-point ambiguities, the at least one subset including $n_f$ second floating-point ambiguities to be fixed

210 — Determining at least one protection level associated with a partial almost-fix navigation solution based on a third plurality of pull-in regions (PIR) and enlarged pull-in regions (EPIR) derived from the at least one subset of $n_f$ second floating-point ambiguities

212 — Determining at least one probability of almost fix (PAF) based on the probability that the at least one partial almost-fix navigation solution is bounded by the at least one protection level

HIGH INTEGRITY PARTIAL ALMOST-FIX SOLUTION

CROSS-REFERENCE TO RELATED APPLICATIONS

For purposes of the USPTO extra-statutory requirements, the present application constitutes a continuation of the U.S. patent application Ser. No. 15/065,260 entitled HIGH INTEGRITY PARTIAL ALMOST-FIX SOLUTION, filed Mar. 9, 2016, which application is currently co-pending.

GOVERNMENT LICENSE RIGHTS

This invention was made with government support under Government Contract No. N00019-08-C-0034, JOINT PRECISION APPROACH AND LANDING SYSTEM DEVELOPMENT, awarded by the Department of the Navy. The government has certain rights in the invention.

BACKGROUND

In selected differential Global Positioning System (GPS) based applications, such as the Joint Precision Approach and Landing System (JPALS), relative navigation functions must meet requirements for high accuracy, high integrity, and high availability. To ensure sub-meter accuracy (e.g., within 20 cm), navigation solutions may be formed using GPS carrier phase measurements. GPS carrier phase integer ambiguities may then be fixed via a Real Time Kinematic (RTK) technique such as the Least-squares AMBiguity Decorrelation Algorithm (LAMBDA) or an integer bootstrapping algorithm. To ensure high integrity, protection levels can be computed to bound errors in the computed navigation solution to a desired degree of confidence. Protection levels depend, among other factors, on the success rate of the carrier phase integer ambiguity fixing process. Generally, if the probability of correct fix (PCF) is sufficiently high, both accuracy and protection levels may be improved with fixed integer ambiguities (as opposed to float integer ambiguities). If the PCF is not high enough, however, improved protection levels may not result from estimated fixed integer ambiguities (relative to estimated float integer ambiguities), even though nominal accuracy may improve. Consequently, both availability and accuracy may suffer, as a fixed solution may not be available after protection levels exceed alert limits.

One technique for maintaining the PCF (i.e., ensuring a reasonably high success rate) while maintaining high accuracy may involve partial ambiguity fixing: fixing only a subset of integer ambiguities that can be estimated with higher confidence while using float integer ambiguity estimates for the remainder, trading accuracy for lower protection levels. However, in the original carrier phase measurement ambiguity domain, using integer bootstrapping alone may lead to lower PCF and higher protection levels. Use of LAMBDA algorithms with integer bootstrapping to decorrelate ambiguities prior to fixing may increase the PCF and lower protection levels; however, the use of LAMBDA may complicate partial fixing.

SUMMARY

A system for determining high-integrity navigation solutions is disclosed. In embodiments, the system includes one or more processors configured for receiving multiple sets satellite-based navigational data from diverse sources using common navigational satellites, e.g., Global Positioning System (GPS) carrier phase measurements from a GPS receiver on board the aircraft in which the system is embodied as well as GPS data from another proximate vehicle (e.g., a carrier on which the aircraft is approaching to land upon). Based on the received GPS data, the system generates a set of GPS floating-point ambiguities. By decorrelating the floating-point ambiguities according to Least-squares AMBiguity Decorrelation Adjustment (LAMBDA) algorithms, the system generates a baseline navigational solution in the LAMBDA domain. From this baseline solution, the system selects decorrelated floating-point ambiguities to be fixed, one at a time. The system determines a protection level associated with a partial almost-fix solution (PAFS) based on the set of floating-point ambiguities and a Probability of Almost Fix (PAF) based on the probability that the PAFS is bounded by the protection level. The system fixes a first decorrelated floating-point ambiguity in the LAMBDA domain and updates the PAFS by substituting the floating-point ambiguity with the corresponding fixed ambiguity. While the PAF remains above a predetermined threshold and the protection level remains below a predetermined alert level, the system selects additional decorrelated floating-point ambiguities to fix and continues to update the PAFS by substituting the appropriate floating-point ambiguities with the corresponding fixed ambiguities. Should the PAF reach the threshold level, or the protection level reach the alert level, the system reverts to and outputs the most recently updated PAFS, replacing the most recently substituted fixed ambiguity with its corresponding floating-point ambiguity from the original set.

A Joint Precision and Approach Landing System (JPALS) is also disclosed. The JPALS is embodied aboard an aircraft and includes a GPS or similar satellite-based navigational receiver for determining position data based on GPS carrier phase signals received from navigational satellites. In embodiments, the JPALS includes processors for receiving the GPS signals used by the navigational receiver to determine ownship position as well as additional GPS carrier phase data from other sources (e.g., a carrier or other vehicle proximate to the aircraft, and upon which the aircraft is approaching to land). Based on the received GPS data, the JPALS generates a set of GPS floating-point ambiguities. By decorrelating the floating-point ambiguities according to LAMBDA algorithms, the JPALS generates a baseline navigational solution in the LAMBDA domain. From this baseline solution, the JPALS selects decorrelated floating-point ambiguities to be fixed, one at a time. The JPALS determines a protection level associated with a partial almost-fix solution (PAFS) based on the set of floating-point ambiguities and a Probability of Almost Fix (PAF) based on the probability that the PAFS is bounded by the protection level. The JPALS fixes a first decorrelated floating-point ambiguity in the LAMBDA domain and updates the PAFS by substituting the floating-point ambiguity of the original set with the corresponding fixed ambiguity. While the PAF remains above a predetermined threshold and the protection level remains below a predetermined alert level, the JPALS selects additional decorrelated floating-point ambiguities to fix and continues to update the PAFS by substituting the appropriate floating-point ambiguities with the corresponding fixed ambiguities. Should the PAF reach the threshold level, or the protection level reach the alert level, the JPALS reverts to and outputs the most recently updated PAFS, replacing the most recently substituted fixed ambiguity with its corresponding floating-point ambiguity from the original set.

A method for determining high-integrity navigation solutions is also disclosed. In embodiments, the method includes receiving, via a processor, satellite-based navigation data from at least two satellite-based navigation sources (e.g., an aircraft within which the processor is embodied as well as a proximate aircraft or other vehicle) associated with one or more common navigation satellites. The method includes generating, via the processor, a set of floating-point ambiguities based on the received satellite-based navigation data. The method includes generating, via the processor, a baseline navigational solution in the LAMBDA domain by decorrelating each of the set of floating-point ambiguities in the LAMBDA domain. The method includes selecting, via the processor, a first decorrelated floating-point ambiguity of the baseline solution to be fixed. The method includes determining, via the processor, a protection level associated with a partial almost-fix solution (PAFS). The method includes determining, via the processor, a Probability of Almost Fix (PAF) based on a probability that the partial almost-fix solution is bounded by the protection level. The method includes fixing the first selected decorrelated floating-point ambiguity of the baseline solution. The method includes generating the partial almost-fix solution by substituting with the fixed ambiguity, in the original set of floating-point ambiguities, the floating-point ambiguity corresponding to the most recently fixed selected decorrelated floating-point ambiguity of the baseline solution. The method includes, while the PAF remains above a threshold level and the protection level remains below an alert level, selecting from the baseline solution additional decorrelated floating-point ambiguities to be fixed and fixing the selected decorrelated floating-point ambiguities in the LAMBDA domain. The method includes updating the partial almost-fix solution by substituting the floating-point ambiguities corresponding to the selected decorrelated floating-point ambiguities with the corresponding fixed ambiguities. Should the PAF reach the threshold or the protection level reach the alert level, the method includes reverting to the last recently updated partial almost-fix solution by replacing the most recently substituted fixed ambiguity with its corresponding floating-point ambiguity.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system for determining precision navigation solutions based on GPS carrier phase measurements received from one or more GPS receivers. The system may increase the confidence level of navigation solutions by decorrelating GPS carrier phase integer ambiguities via Least-squares AMBiguity Decorrelation Adjustment (LAMBDA) and partially fixing the integer ambiguities in the LAMBDA domain. System integrity may be enhanced via Partial Almost Fixing, or determining the probability that floating-point navigation solutions are included within correct integer ambiguities or within a subset of incorrect integer ambiguities with single-cycle or small multiple-cycle errors.

Figure 1A:
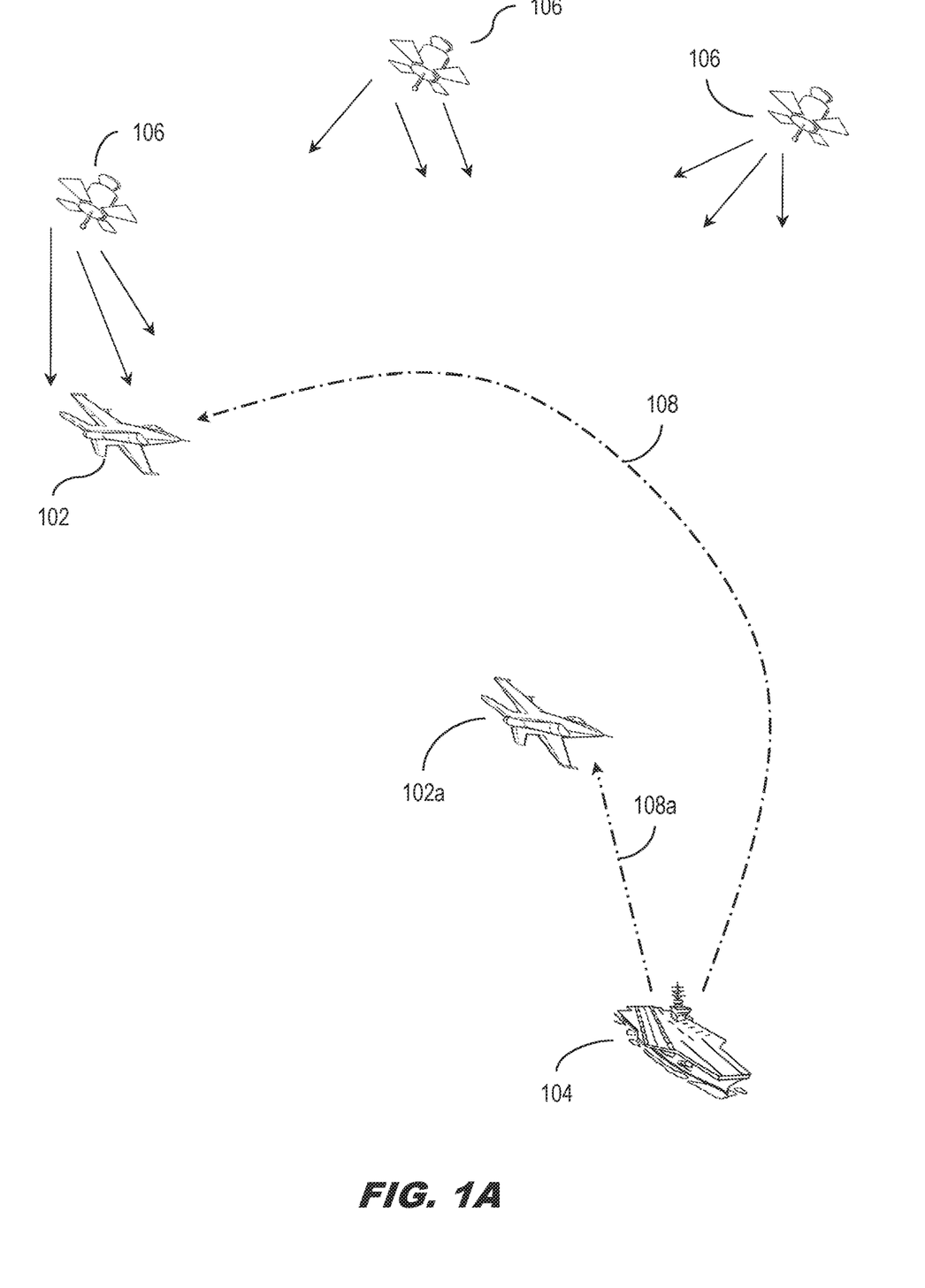
FIG. 1A illustrates exemplary embodiments of a system according to the inventive concepts disclosed herein.

Referring now to FIG. 1A, an exemplary embodiment of a system 100 according to the inventive concepts disclosed herein may be embodied in a Joint Precision Approach and Landing System (JPALS) aboard an aircraft 102 operating proximate to an aircraft carrier or similar ship 104; the aircraft 102 may be based aboard the ship 104. Both the aircraft 102 and the ship 104 may continually generate position information based on GPS signals received from one or more common GPS satellites 106. For example, the aircraft 102, not performing a precision landing operation to the ship 104, may determine its own position based on signals received from GPS satellites (which need not be common in the case of a single aircraft determining a standalone position). The aircraft 102 may also receive coarse position and speed data (108) associated with the ship 104 for the purposes of coarse relative navigation. The aircraft 102a, however, executing a precision approach operation to the ship 104 (e.g., within 10 NM of the ship 104) may receive from the ship 104 approach data and GPS measurements (108a) received in turn by the ship 104 from the common GPS satellites 106. As the aircraft 102a approaches the ship 104 (e.g., toward a landing aboard the ship 104), the ship 104 may provide increasingly sophisticated approach data 108a so that the aircraft 102a may determine a precise navigational vector for precision approach to the ship 104.

Figure 1B:
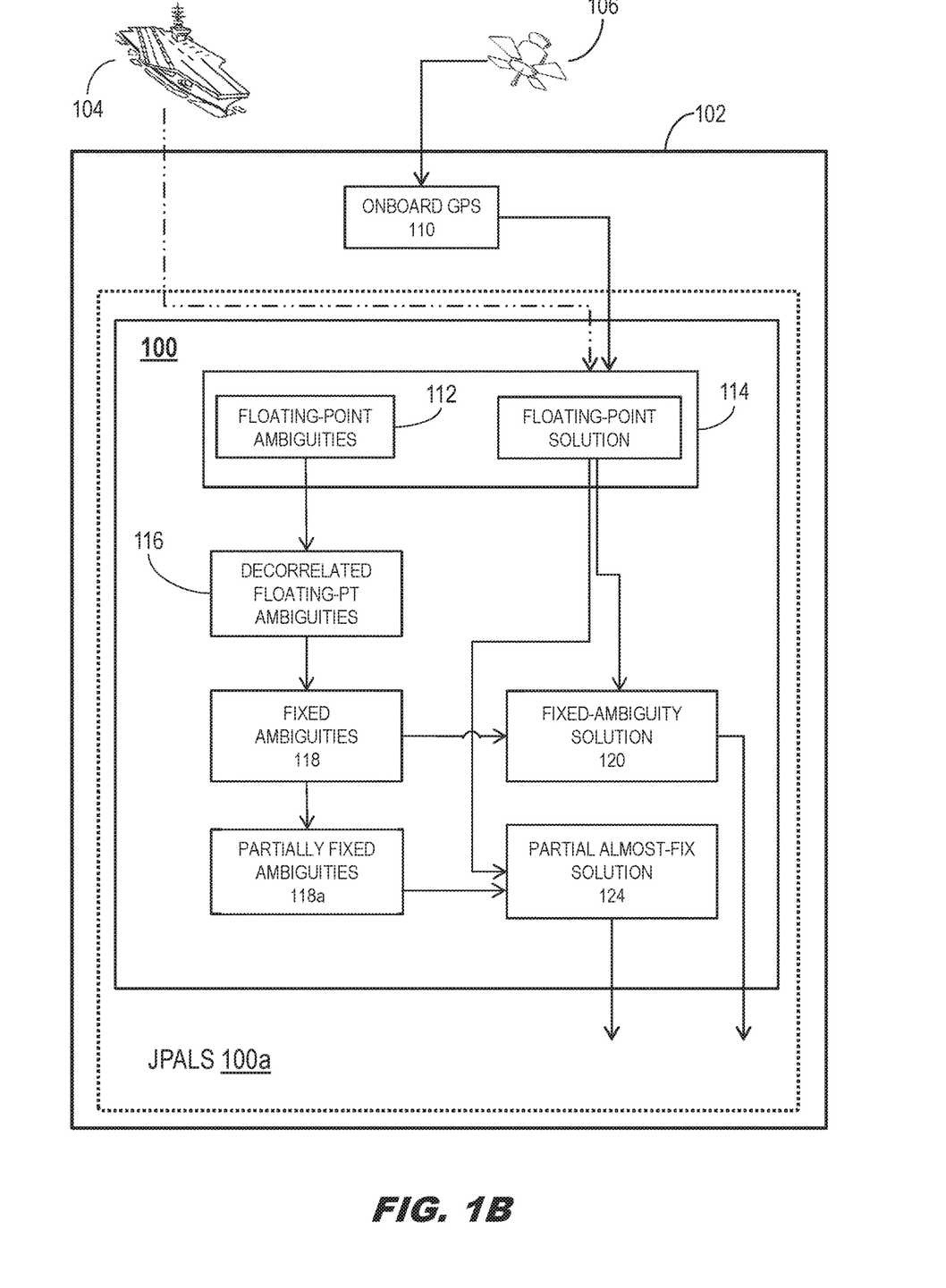
FIG. 1B is a block diagram illustrating an exemplary embodiment of a system according to the inventive concepts disclosed herein.

Referring now to FIG. 1B, an exemplary embodiment of a system 100 for determining precise navigation solutions may be embodied in aircraft-based JPALS equipment 100a aboard the aircraft 102. The system may receive GPS measurements from the common GPS satellites 106 (via an onboard GPS receiver 110) and the ship 104, including GPS carrier signals. Based on the received GPS measurements, the system 100 may generate floating-point baseline navigation solutions 114 comprising sets of GPS floating-point carrier phase ambiguities 112. For example, the floating-point baseline navigation solution 114 may include a set of n floating-point carrier phase ambiguities 112 (where n is a positive integer). The determined GPS floating-point carrier phase ambiguities 112 may be decorrelated via LAMBDA decorrelation to obtain LAMBDA-domain floating-point ambiguities 116. While existing Geometric Extra Redundancy Almost Fix Solution (GERAFS) functionality in a JPALS 100a may convert the LAMBDA-domain floating-point ambiguities 116 back to the original carrier-phase measurement ambiguity domain (e.g., via the inverse of a LAMBDA transformation matrix), the system 100 may generate LAMBDA-domain fixed integer ambiguities 118 by fixing the LAMBDA-domain floating-point ambiguities 116 in the LAMBDA domain.

For example, $\hat{a}$ may be a vector of floating-point carrier-phase ambiguities 112 in the original carrier-phase measurement ambiguity domain, $\check{a}$ may be a vector of fixed integer ambiguities (not shown) in the original carrier-phase measurement ambiguity domain, $\hat{b}$ may be a vector of an estimated floating-point baseline navigation solution 114, $\check{b}$ may be a vector of a more precise fixed-ambiguity (fully fixed) baseline navigation solution 120, $Q_{\hat{b}\hat{a}}$ may be the error covariance between the floating-point baseline navigation solution 114 and the floating-point carrier-phase ambiguities 112, and $Q_{\hat{a}}$ may be the error covariance of the floating-point carrier-phase ambiguities 112. Therefore, according to Real Time Kinematic (RTK) theory $$\check{b} = \hat{b} - Q_{\hat{b}\hat{a}} Q_{\hat{a}}^{-1} (\hat{a} - \check{a}) \tag{1}$$

and the floating-point baseline navigation solution $\hat{b}$ (114) may be updated with a list (118a) of partially fixed integer ambiguities $\check{a}$ to obtain a partial almost-fix navigation solution 124 which may approximate the fixed-ambiguity baseline navigation solution $\check{b}$ (120). The correction e in the floating-point baseline navigation solution $\hat{b}$ (114) may be defined as:

$$e = Q_{\hat{b}\hat{a}} Q_{\hat{a}}^{-1} (\hat{a} - \check{a}) \tag{2}$$

To increase the success rate of the fixing process, floating-point carrier-phase ambiguities $\hat{a}$ (112) in the original carrier-phase measurement ambiguity domain may be transformed into decorrelated floating-point ambiguities z (116) in the LAMBDA domain using a LAMBDA transformation Z, such that $$z = Z^T a \tag{3}$$

The error covariance between the floating-point baseline navigation solution $\hat{b}$ (114) and the LAMBDA-domain floating-point ambiguities z (116) may be $Q_{\hat{b}\hat{z}}$, and the error covariance of the LAMBDA-domain floating-point ambiguities z may be $Q_{\hat{z}}$, such that $$Q_{\hat{b}\hat{z}} = E(\hat{b}\hat{z}^T) = E(\hat{b}(Z^T\hat{a})^T) = E(\hat{b}\hat{a}^T Z) = E(\hat{b}\hat{a}^T)Z = Q_{\hat{b}\hat{a}}Z \text{ and}$$

$$Q_{\hat{b}\hat{a}} = Q_{\hat{b}\hat{z}} Z^{-1} \tag{4}$$

In addition, $Q_{\hat{z}} = Z^T Q_{\hat{a}} Z$ and therefore $$Q_{\hat{a}} = Z^{-T} Q_{\hat{z}} Z^{-1} \tag{5}$$

It may follow from equations (2), (4), and (5) that $$e = Q_{\hat{b}\hat{a}} Q_{\hat{a}}^{-1}(\hat{a}-\check{a}) = Q_{\hat{b}\hat{z}} Z^{-1} Z Q_{\hat{z}}^{-1} Z^T (\hat{a}-\check{a}) = Q_{\hat{b}\hat{z}} Q_{\hat{z}}^{-1} (Z^T \hat{a} - Z^T \check{a})$$

and from equation (3) that $e = Q_{\hat{b}\hat{z}} Q_{\hat{z}}^{-1}(\hat{z}-\check{z})$; therefore, equation (1) may become $$\check{b} = \hat{b} - Q_{\hat{b}\hat{z}} Q_{\hat{z}}^{-1}(\hat{z}-\check{z}) \tag{6},$$

showing that the correction in the floating-point baseline navigation solution $\hat{b}$ may be equivalently defined and corrected in the LAMBDA domain. Accordingly, both partial fixing (e.g., fixing only a subset 122 of decorrelated floating-point carrier-phase ambiguities 116 to generate a partial almost-fix navigation solution 124) and partial correction updates (e.g., removing only a subset of associated errors in the floating-point baseline navigation solution 114) may be accomplished via fixing decorrelated floating-point ambiguities 116 in the LAMBDA domain. For example, any unfixed floating-point ambiguities 116 in the LAMBDA domain may be equivalent to floating-point ambiguities z, and therefore corresponding elements of the vector ($\hat{z}-\check{z}$) may be zero.

The system 100 may additionally determine an error covariance $Q_{\check{b}}$ of the partial almost-fix navigation solution 124 approximating the fixed-ambiguity baseline navigation solution b̌ (120). For example, if M is a matrix defining the decorrelated floating-point ambiguities z (116) being fixed in the LAMBDA domain (resulting in LAMBDA-domain fixed integer ambiguities 118) for the partial almost-fix navigation solution 124, M may be a diagonal matrix corresponding to the partial almost-fix navigation solution such that $$M = \begin{bmatrix} m_{11} & 0 & 0 & 0 \\ 0 & m_{22} & 0 & 0 \\ 0 & 0 & \ldots & 0 \\ 0 & 0 & 0 & m_{nn} \end{bmatrix};$$

$$m_{ii} = \begin{cases} 1 \text{ (fixed)}, & i = 1, \ldots, n_f \\ 0 \text{ (float/unfixed)}, & i = n_f + 1, \ldots, n \end{cases}$$

where $n_f$ may be the total number of LAMBDA-domain fixed ambiguities 118 with $(n-n_f)$ ambiguities remaining floating-point. A fully fixed navigation solution (i.e., a fixed-ambiguity navigation solution 120) may be indicated where M is set to the identity matrix, while a floating-point baseline navigation solution 114 may be indicated by a zero matrix. The partial update equation (6) may become $$\check{b} = \bar{b} - Q_{bz} Q_z^{-1} M(\hat{z} - \check{z}) \qquad (7),$$

and the error covariance $$Q_{\check{b}} = Q_b - Q_{bz}(MQ_z^{-1} + Q_z^{-}M - Q_z^{-}MQ_zMQ_z^{-})Q_{zb} \qquad (8)$$

of the partial almost-fix navigation solution 124 may be useful in error covariance analysis.

Generally, the system 100 may improve the PCF and the reliability of the fixing process through generation of a partial almost-fix navigation solution 124, e.g., by partial fixing of floating-point ambiguities 116 in the LAMBDA domain as described above. However, to ensure sufficiently high system integrity for incorporation in JPALS equipment 100a (FIG. 1A), partial fixing in the LAMBDA domain may be combined with other techniques. For example, Geometry Extra Redundant Almost Fix Solution (GERAFS) functionality of the JPALS 100a meets integrity requirements via the Probability of Almost Fix (PAF). The system 100a may improve on GERAFS functionality by fixing decorrelated floating-point ambiguities 116 in the LAMBDA domain rather than transforming the floating-point ambiguities back to their original domain for fixing. However, GERAFS may define the PAF as the probability that a partial almost-fix navigation solution 124 is bounded by protection levels defined or predetermined by the JPALS equipment 100a, which bounds errors in the partial almost-fix navigation solution 124 to the desired confidence level.

Similarly, if a fully fixed solution, i.e., a fixed-ambiguity baseline navigation solution 120, cannot be achieved without protection levels exceeding alert limits, the system 100 may generate the partial almost-fix solution 124 by fixing only a partial list 118a of floating-point ambiguities 116 to generate fixed integer ambiguities 118. The system 100 may compute an integrity bound (e.g., protection level) based on the GERAFS PAF, or the probability that the floating-point baseline navigation solution 114 is derived from floating-point ambiguities 112 within either Pull-in Regions (PIR) containing correctly fixed integer ambiguities (118) or a selected set of Enlarged Pull-in Regions (EPIR) containing incorrectly fixed floating-point ambiguities (116) with errors of no more than a single cycle or a small-multiple cycle. The system 100 may determine the probability that the partial almost-fix navigation solution is within the computed integrity bound based on a partial list of fixed integer ambiguities 118. The EPIR may provide additional system integrity at the expense of large protection levels even when only single-cycle errors are included.

Broadly speaking, the system 100 may provide (e.g., via airborne integrity processing) protection levels to bound errors in the partial almost-fix navigation solution 124 and/or the fixed-ambiguity baseline navigation solution b (120), the protection levels based on data and estimates from airborne and/or ship system components aboard the ship 104 as well as the aircraft 102. Protection level components may vary depending on the operational mode of the system 100 (e.g., autonomous navigation/surveillance (airborne-state only); precision approach/surveillance (relative states determined by precision relative navigation (RelNav) processing and incorporating the most complex array of error sources as described below, as well as the most stringent integrity levels; ship relative navigation (e.g., in the absence of precision RelNav)). Broadly speaking, protection levels may include vertical and lateral components (vertical protection level (VPL), lateral protection level (LPL)) respectively bounding vertical and lateral position errors.

For example, ship system data and estimates may pertain to error/confidence levels of predicted ship states and/or geometric relations between various shipboard and aircraft locations, e.g., local-level (LL) positions of GPS antennas and/or inertial measurement units (IMU) aboard the ship 104 and aircraft 102; ship reference points (SRP); stabilized touchdown points (TDP); aircraft guidance control points (GCP); baseline vectors between shipboard elements in the ship reference frame (or from the SRP to the stabilized TDP in the LL frame); relative position solutions from the SRP and stabilized TRP to the aircraft GCP in the LL frame; and errors associated with the extrapolation of prior relative position solutions according to ship and aircraft motion, due to the need for solutions based on latent measurements, e.g., wherein airborne position measurements may be stored until synchronized ship data arrives via uplink. Error components may broadly include differential GPS (DGPS) errors; ship antenna-to-TDP survey errors; ship/aircraft lever arm errors; relative velocity errors; ship/aircraft acceleration/propagation errors; and path stabilization errors.

With respect to the system 100, protection levels for bounding error in a user relative state may be reduced to contributions from multiple error sources, e.g., double-differenced GPS, ship/TDP state. airborne state, airborne lever arm, and flight path guidance, represented in an approach reference frame. For example, with respect to GERAFS protection level calculation, GPS error may be based in a minimum probability that the set of fixed integer ambiguities (118, 118a) corresponding to the fixed-ambiguity solution 120 or the partial almost-fix solution 124 is either in the conventional PIR (e.g., minimum Probability of Correct Fix, $PCF_{min}$) or in the EPIR (e.g., minimum Probability of Almost Fix, $PAF_{min}$) relative to the floating-point solution 114. For example, with respect to the H0 unfaulted case, the $PCF_{min}$ and $PAF_{min}$ thresholds may have nominal values set by the system (e.g., 0.998 and $1-4e^{-7}$ respectively).

With respect to the floating-point solution 114, error sources may be assumed from non-faulted measurement sources and therefore characterized by single-sigma terms in each dimension, e.g., $\sigma_{DGPS\_Float}$, $\sigma_{Rel\_State\_Prop}$, $\sigma_{Ship\_LevArm\_Att}$, $\sigma_{Ship\_Survey}$, $\sigma_{Air\_LevArm\_Att}$, $\sigma_{Air\_Survey}$, $\sigma_{Ship\_State\_Prop}$. Some of these terms may be common for protection-level calculation purposes across float and fixed solutions and may be consolidated into a common term $\sigma_{common}^2$. Additional combined terms, e.g., $\sigma_{Float}^1$, may be derived from the covariance matrices of the floating-point solution set.

Still with respect to the floating-point solution 114, protection level calculation may follow from the sigma levels of error sources described above. For example, 1-sigma bounds $\sigma_{vert\_Float}$ and $\sigma_{lat\_Float}$ may be based on these common and combined terms with respect to the vertical and lateral differenced line-of-sight unit vectors respectively. Vertical and lateral protection levels may then be calculated:

$$VPL_{Float} = K_{ffmd\_float} \sigma_{vert\_Float}$$

$$LPL_{Float} = K_{ffmd\_float} \sigma_{lat\_Float}$$

where, e.g., the K-factor $$K = \sqrt{2} \operatorname{erf}^{-1}(1 - P_{bound})$$

may be based on inverting an error function erf (x) describing the double-sided tails of a Gaussian distribution, and where $P_{bound}$ is the probability with which the protection level must bound navigation errors. K-factors generally may be derived from design parameters, e.g., an allocated Probability of Not Almost Fix (PNAF; e.g., $4e^{-7}$), $PCF_{min}$, and the allocation of integrity risk between PIR and EPIR (hence, $K_{ffmd\_float}$, $K_{ffmd\_PIR}$, $K_{ffmd\_EPIR}$).

With respect to the fixed-ambiguity solution 120 (based on whether the current set of fixed ambiguities 118 is in the PIR or (rarely) the EPIR), protection level calculation is similar:

$$VPL_{Fixed} = K_{ffmd\_PIR} \sigma_{vert\_PIR}$$

$$VPL_{EPIR} = K_{ffmd\_EPIR} \sigma_{vert\_EPIR}$$

(Lateral protection levels $LPL_{Fixed}$, $LPL_{EPIR}$ may be calculated along similar lines.) Protection levels with respect to the EPIR (e.g., $VPL_{EPIR}$, $LPL_{EPIR}$) may incorporate wrong-fix biases associated with the EPIRs and added to the 1-sigma contributions described above. With respect to the partial almost-fix solution 124 (and each corresponding set of fixed ambiguities 118a as f is decremented, as described in greater detail below), vertical and lateral protection levels may be calculated as a maximum of PIR and EPIR-associated terms:

$$VPL_{AFS} = \max(VPL_{Fixed}, VPL_{EPIR})$$

$$LPL_{AFS} = \max(LPL_{Fixed}, LPL_{EPIR})$$

Calculated protection level values (e.g., expressed in terms of meters) may be compared against alert limits. For example, alert limits may indicate the amount of error with respect to lateral or vertical deviation (e.g., also in meters) that would be considered hazardously misleading information (HMI) for a particular application, e.g., a lateral alert limit (LAL) defined as a limit on lateral deviations from a flight path and a vertical alert limit (VAL) defined as a limit on lateral deviations from a flight path. Alert limits may be dependent on a particular application or operating mode; for example, precision surveillance accuracy requirements are less stringent than precision approach accuracy requirements, so precision surveillance alert limits may be greater than precision approach alert limits. If either a vertical or lateral protection level is found to meet or exceed a corresponding vertical or lateral alert limit, the corresponding fixed-ambiguity solution 120 or partial almost-fix solution 124 may be flagged as invalid.

Figure 2A:
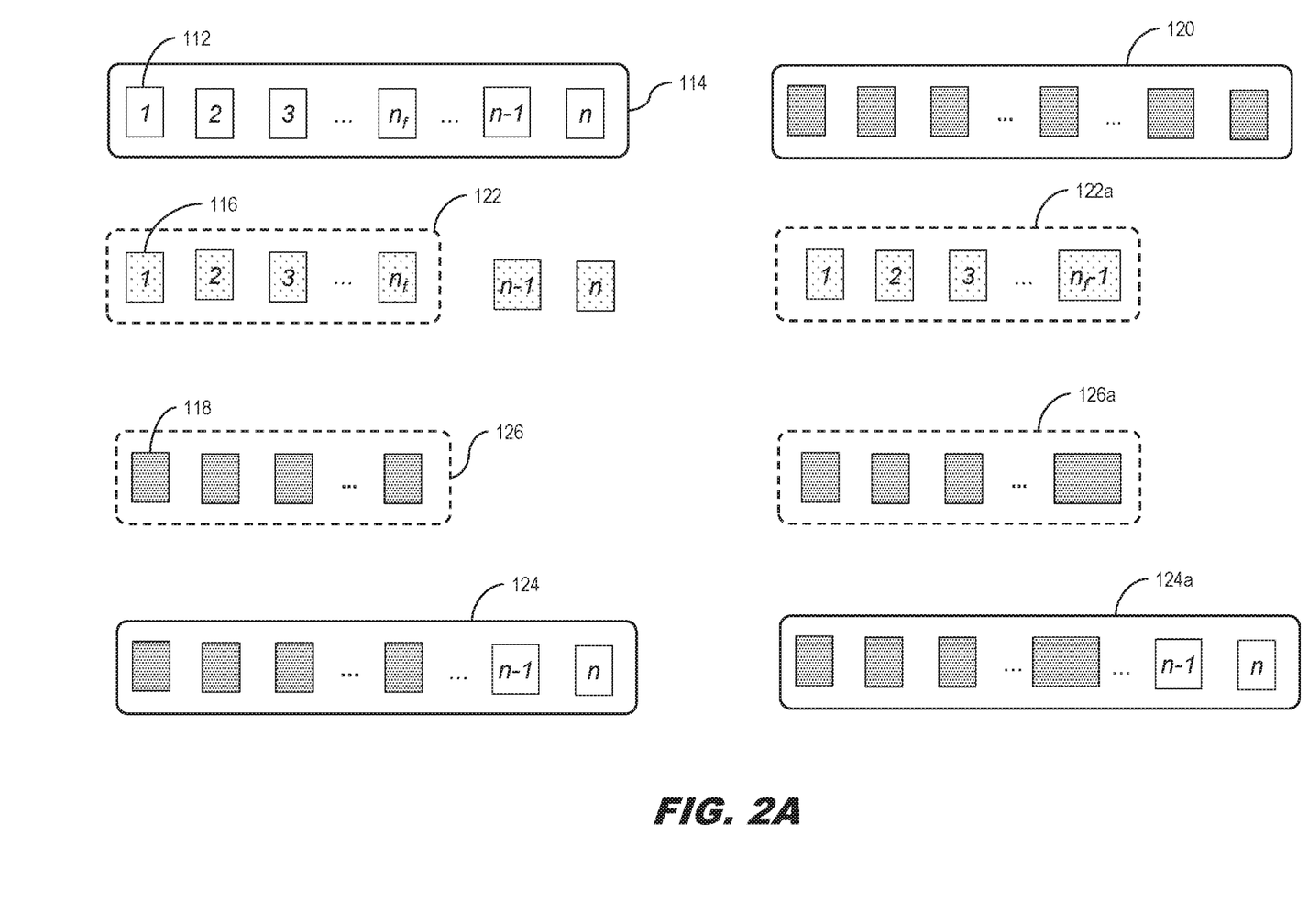
FIG. 2A is a block diagram illustrating operations of the system of FIG. 1B.

Referring to FIG. 2A, an implementation of the system 100 of FIG. 1B may generate a floating-point baseline navigation solution 114 including a set of n floating-point carrier-phase ambiguities 112. The system 100 may decorrelate the set of n floating-point carrier-phase ambiguities 112 in the LAMBDA domain to generate a set of n decorrelated floating-point ambiguities 116 corresponding to the set of n floating-point carrier-phase ambiguities 112. The system may select a subset 122 of $n_f$ decorrelated floating-point ambiguities to be fixed ($n_f \le n$). The system may determine protection levels and PAF; while protection levels remain below alert limits and PAF remains above a threshold (e.g., a threshold predetermined or preset by the system 100 or the JPALS equipment 100a), the system 100 may generate a set 126 of LAMBDA-domain fixed ambiguities 118 by fixing the subset 122 of $n_f$ decorrelated floating-point ambiguities 116 in the LAMBDA domain. The system may generate a partial almost-fix navigation solution 124 by replacing each floating-point carrier-phase ambiguity 112 of the floating-point baseline navigation solution 114 with the corresponding LAMBDA-domain fixed ambiguity 118 (i.e., the LAMBDA-domain fixed ambiguity corresponding to the decorrelated floating-point ambiguity 116 based on the particular floating-point carrier-phase ambiguity). In the case where the system 100 selects a subset 122 wherein $n_f = n$, and protection levels remain below alert limits while PAF remains above the threshold, the result may be a full fixed-ambiguity navigation solution 120 wherein every floating-point carrier-phase ambiguity 112 is replaced by a LAMBDA-domain fixed ambiguity 118. The system may output the full fixed-ambiguity navigation solution 120 when this solution is available. If protection levels rise above alert limits or PAF drops below the threshold for a partial almost-fix navigation solution 124 including a subset 122 of size $n_f$, the system 100 may continue the iterative process by decrementing $n_f$ to ($n_f - 1$) by removing a decorrelated floating-point ambiguity 116 from the subset 122, resulting in a subset 122a including ($n_f - 1$) decorrelated floating-point ambiguities 116. The system 100 may generate a set 126a of LAMBDA-domain fixed ambiguities 118 by fixing the subset 122a of ($n_f - 1$) decorrelated floating-point ambiguities 116 in the LAMBDA domain, and generate a partial almost-fix navigation solution 124a by replacing the corresponding floating-point carrier-phase ambiguities 112 of the floating-point baseline navigation solution 114 with the ($n_f - 1$) LAMBDA-domain fixed ambiguities 118 of the subset 122a, and output the partial almost-fix navigation solution 124a if protection levels remain below alert limits and the PAF remains above the threshold. If the system 100 continues to decrement f such that $n_f$ drops to zero, the system may output the original floating-point baseline navigation solution 114.

Figure 2B:
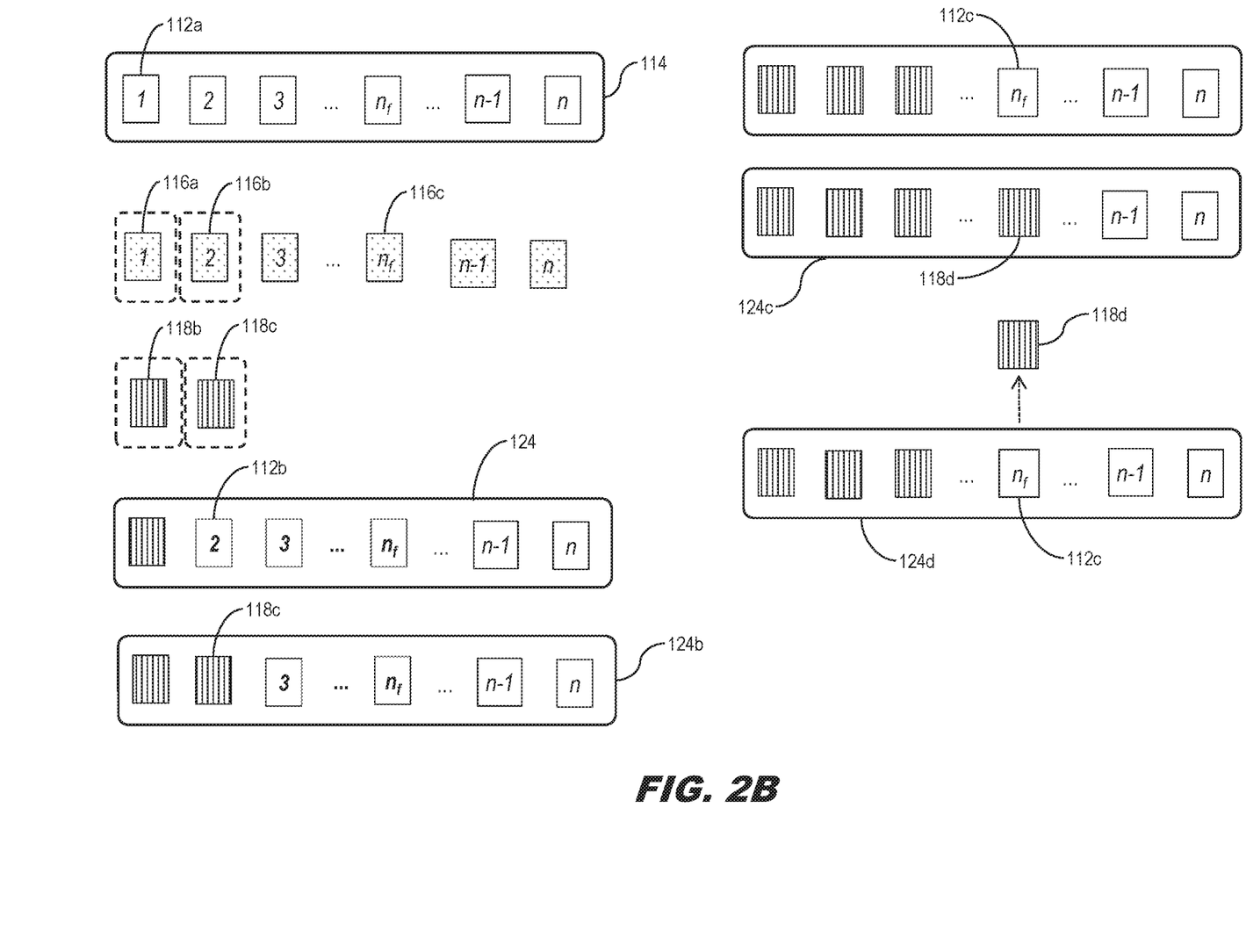
FIG. 2B is a block diagram illustrating alternative operations of the system of FIG. 1B.

Referring to FIG. 2B, an alternative implementation of the system 100 of FIG. 1B may generate a partial almost-fix navigation solution 124 by fixing floating-point ambiguities 116 in the LAMBDA domain individually, or sequentially, until protection levels reach the alert limits. For example, the system 100 may generate a floating-point baseline navigation solution 114 including an ordered set of corresponding LAMBDA-domain decorrelated floating-point ambiguities 116 based on each floating-point carrier-phase ambiguity 112 of the floating-point baseline navigation solution as in FIG. 2A above. The system 100 may order the LAMBDA-domain decorrelated floating-point ambiguities 116 of the floating-point baseline navigation solution 114, e.g. in descending order of PCF, the first decorrelated floating-point ambiguity 116a to be fixed having the highest PCF, the second decorrelated floating-point ambiguity 116b having the next highest PCF, etc. The system 100 may select the first LAMBDA-domain decorrelated floating-point ambiguity 116a to be fixed and add the selected first decorrelated floating-point ambiguity to a subset of $n_f$ decorrelated floating-point ambiguities (wherein the value of f is initially set to zero). After protection levels and PAF are determined by the system 100, the system may fix the first selected decorrelated floating-point ambiguity 116a in the LAMBDA domain to the value of the corresponding LAMBDA-domain fixed ambiguity 118b. The system may generate a partial almost-fix navigation solution 124 by updating the first floating-point carrier-phase ambiguity 112a of the floating-point baseline navigation solution 114 (and corresponding to the selected first decorrelated floating-point ambiguity 116a) with the generated LAMBDA-domain fixed ambiguity 118b.

The system 100 may iterate through successive partial almost-fix navigation solutions 124b-d while protection levels remain below alert limits and PAF remains above the threshold level by selecting successive decorrelated floating-point ambiguities to fix (e.g., the decorrelated floating-point ambiguity 116 having the highest remaining PCF), one at a time, until alert limits are exceeded or PAF drops below the threshold. For example, the system 100 may continue the iterative process by selecting the second decorrelated floating-point ambiguity 116b (having the highest remaining PCF) to be fixed. The system 100 may fix the second decorrelated floating-point ambiguity 116b in the LAMBDA domain (to the value of the LAMBDA-domain fixed ambiguity 118c) and generate an updated partial almost-fix navigation solution 124b wherein the second floating-point carrier phase ambiguity 112b of the floating-point baseline navigation solution 114 (and the prior partial almost-fix navigation solution 124) is replaced with the second LAMBDA-domain fixed ambiguity 118c derived from the second decorrelated floating-point ambiguity 116b corresponding to the second floating-point carrier phase ambiguity 112b. As each successive floating-point ambiguity 116 is fixed to the value of a fixed integer ambiguity 118, the PCF may be lowered and more EPIR may be included to meet the PAF requirement. If the protection levels associated with a partial almost-fix navigation solution 124c generated by the system 100 exceed the alert limits (or if the PAF drops below the threshold), the system 100 may remove the most recently added LAMBDA-domain fixed ambiguity 118c in favor of the floating-point carrier phase ambiguity 112c it replaced, reverting to the immediately prior partial almost-fix navigation solution (124d) wherein protection levels remained below alert limits and PAF remained above the threshold value. For example, to achieve the partial almost-fix navigation solution 124c, the system 100 may have most recently replaced the $n_f$-th floating-point carrier-phase ambiguity 112c (of the set 114 of n floating-point carrier-phase ambiguities) with the LAMBDA-domain fixed ambiguity 118d derived from fixing the $n_f$-th decorrelated floating-point ambiguity 116c corresponding to the $n_f$-th floating-point carrier-phase ambiguity 112c. The system 100 may replace the most recently updated LAMBDA-domain fixed ambiguity 118d with the $n_f$-th floating-point carrier-phase ambiguity 112c to restore and output the immediately prior partial almost-fix navigation solution 124d. As the result of this process, the system 100 may output the original floating-point baseline navigation solution 114 (if $n_f$=0) or a full fixed-ambiguity navigation solution 120 (if $n_f$=n), as shown by FIG. 2A.

Figure 3A:
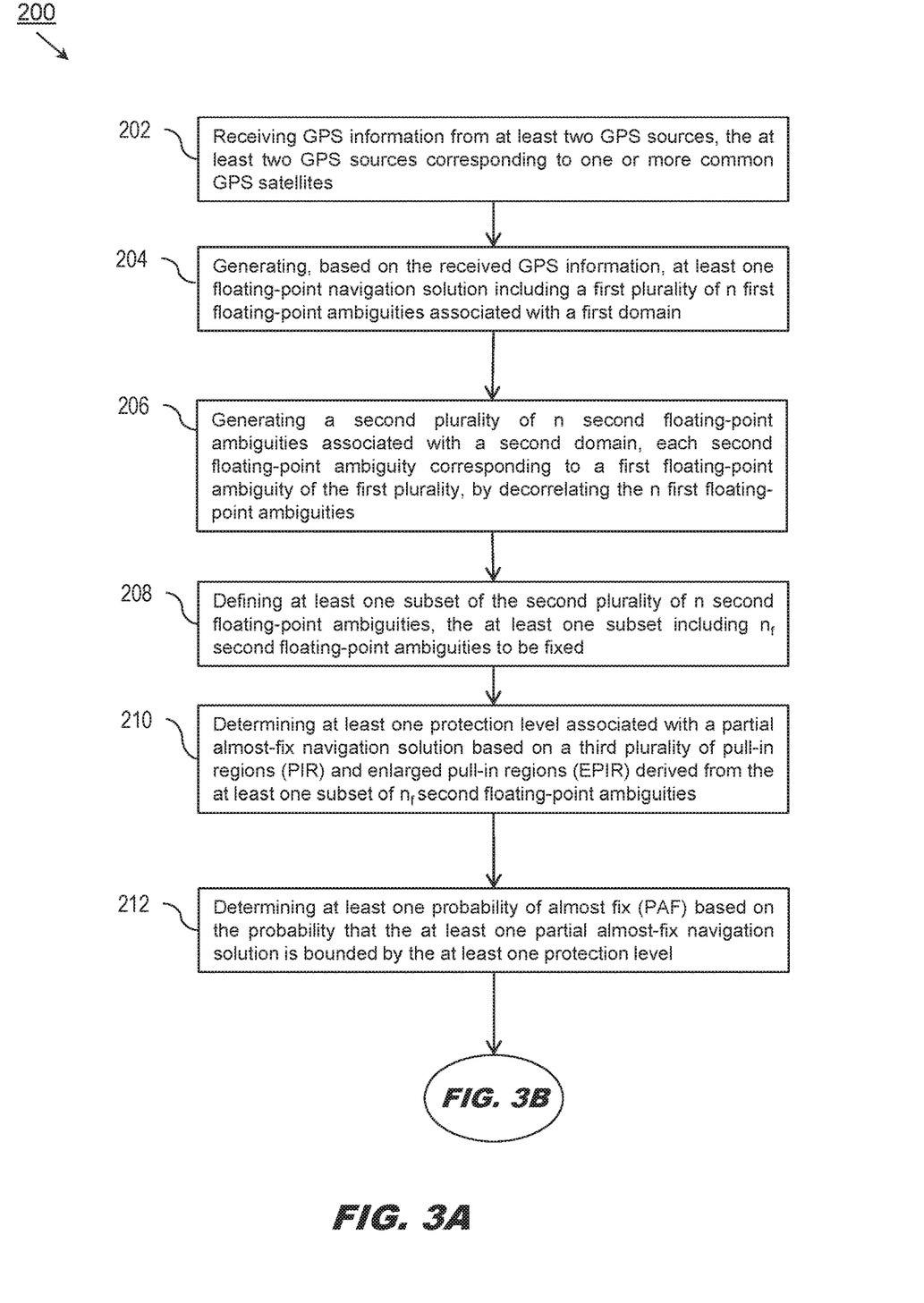
FIGS. 3A-3B are process flow diagrams illustrating a method according to embodiments of the inventive concepts disclosed herein.

Referring now to FIG. 3A, an exemplary embodiment of a method 200 for determining a precision navigation solution according to the inventive concepts disclosed herein may include one or more of the following steps. At a step 202, the system 100 may receive GPS information from at least two GPS sources, the GPS sources corresponding to one or more common GPS satellites 106. For example, the system 100 may be embodied in aircraft-based JPALS equipment 100a which receives GPS information directly from common GPS satellites 106 via a GPS receiver 112 onboard the aircraft 102 in which the system 100 is embodied as well as GPS information 108, 108a from a ship 104 or other vehicle proximal to the aircraft 102. The system 100 may receive GPS carrier waves associated with GPS signals.

At a step 204, the system 100 generates a floating-point baseline navigation solution 114 including a set of n floating-point carrier-phase ambiguities 112 based on the received GPS information. The floating-point baseline navigation solution 114 and set of n floating-point carrier-phase ambiguities 112 may be associated with the original domain (e.g., carrier-phase measurement ambiguity domain).

At a step 206, the system 100 generates a set of n Least-squares AMBiguity Decorrelation Adjustment (LAMBDA)-domain floating-point ambiguities 116 corresponding to the set of n floating-point carrier phase ambiguities 112 by decorrelating the set of n floating-point carrier-phase ambiguities 112 via LAMBDA algorithms. The system 100 may generate error covariances associated with the LAMBDA-domain floating-point ambiguities 116.

At a step 208, the system 100 defines a subset 122 of the set of n decorrelated LAMBDA-domain floating-point ambiguities 116, the subset 122 including f decorrelated LAMBDA-domain floating-point ambiguities to be fixed in the LAMBDA domain.

At a step 210, the system 100 determines protection levels associated with a partial almost-fix navigation solution 124 based on the probability that the partial almost-fix navigation solution 124 is derived from within a PIR of correctly fixed LAMBDA-domain fixed integer ambiguities 118 (e.g., having zero errors) or an EPIR of incorrect (e.g., unfixed, incorrectly fixed) LAMBDA-domain floating-point integer ambiguities 116 wherein the errors associated with the LAMBDA-domain floating-point integer ambiguities are no more than a single cycle (or, in the alternative, multiple cycles). The EPIR may be narrowed to incorrectly fixed LAMBDA-domain floating-point integer ambiguities 116 involving errors of a single cycle.

At a step 212, the system 100 determines a PAF based on the probability that the partial almost-fix navigation solution 124 is bounded by the determined protection levels.

Figure 3B:
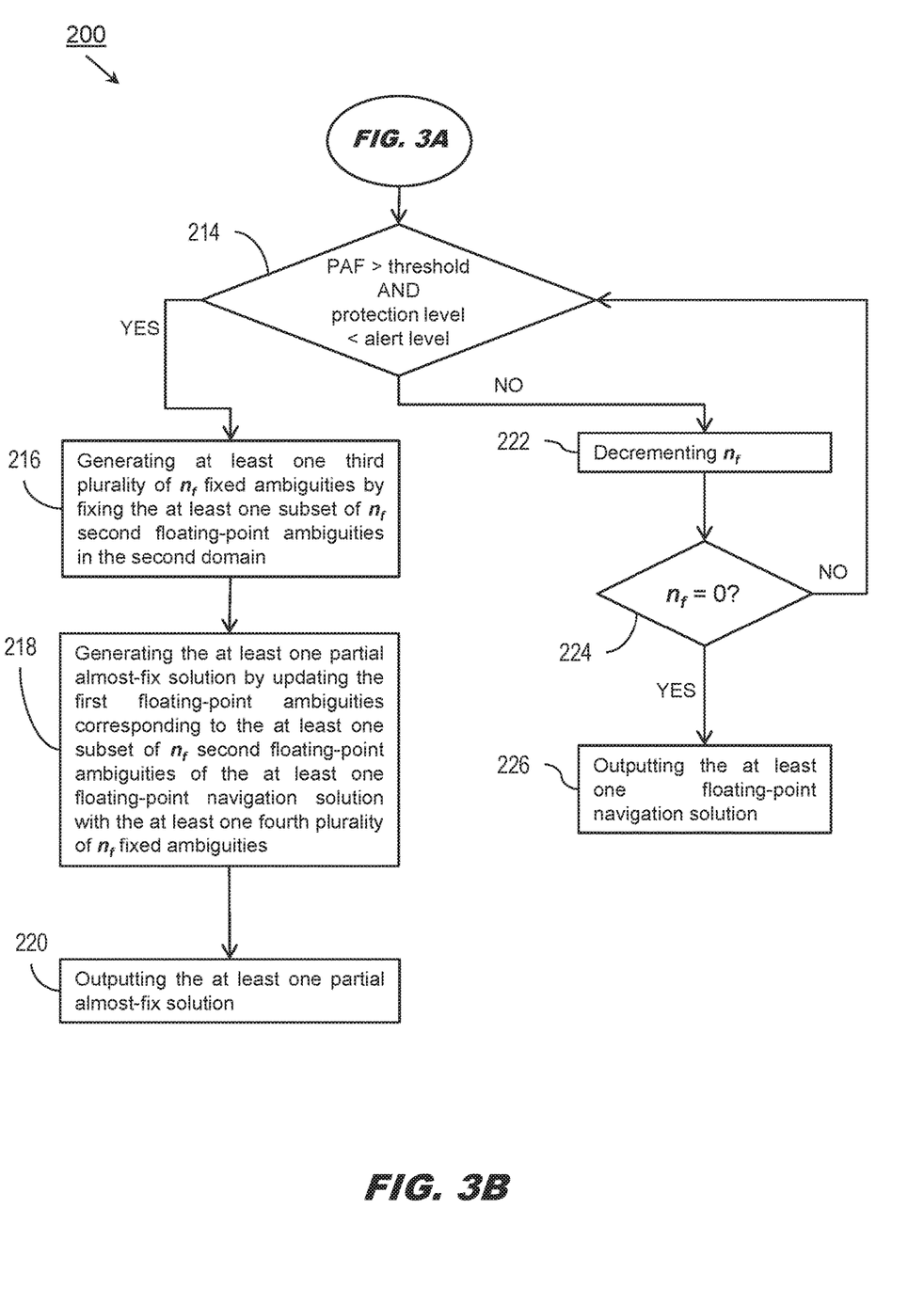

Referring to FIG. 3B, at a step 214, the system 100 determines whether the PAF is higher than a predetermined threshold and the determined protection levels are under predetermined alert limits.

While the PAF is above the threshold value and protection levels are under alert limits, at a step 216, the system 100 generates a set 126 of f LAMBDA-domain fixed integer ambiguities 118 by fixing the subset 122 of $n_f$ decorrelated LAMBDA-domain floating-point ambiguities 116 in the LAMBDA domain.

At a step 218, the system 100 generates the partial almost-fix navigation solution 124 by updating the $n_f$ floating-point carrier-phase ambiguities 112 (of the floating-point baseline navigation solution 114) corresponding to the subset 122 of $n_f$ decorrelated LAMBDA-domain floating-point ambiguities 116 with the set 126 of $n_f$ LAMBDA-domain fixed integer ambiguities 118.

At a step 220, the system 100 outputs the updated partial almost-fix navigation solution 124. The output solution may be a full fixed ambiguity solution 120.

If either the PAF drops below the threshold or the protection levels exceed the alert limits, at a step 222 the system 100 decrements $n_f$ by removing a decorrelated LAMBDA-domain floating point ambiguity 116 from the subset 122 of $n_f$ decorrelated LAMBDA-domain floating-point ambiguities, thereby setting $n_f$ to $n_f-1$. At a step 224, the system 100 determines whether $n_f$ is zero (e.g., the subset 122 of $n_f$ decorrelated LAMBDA-domain floating-point ambiguities 116 is empty). If $n_f$ is non-zero, the method 200 resumes at step 214 with the decremented $n_f$. If $n_f$ is zero, at a step 226 the system 100 outputs the floating-point baseline navigation solution 114.

Figure 4A:
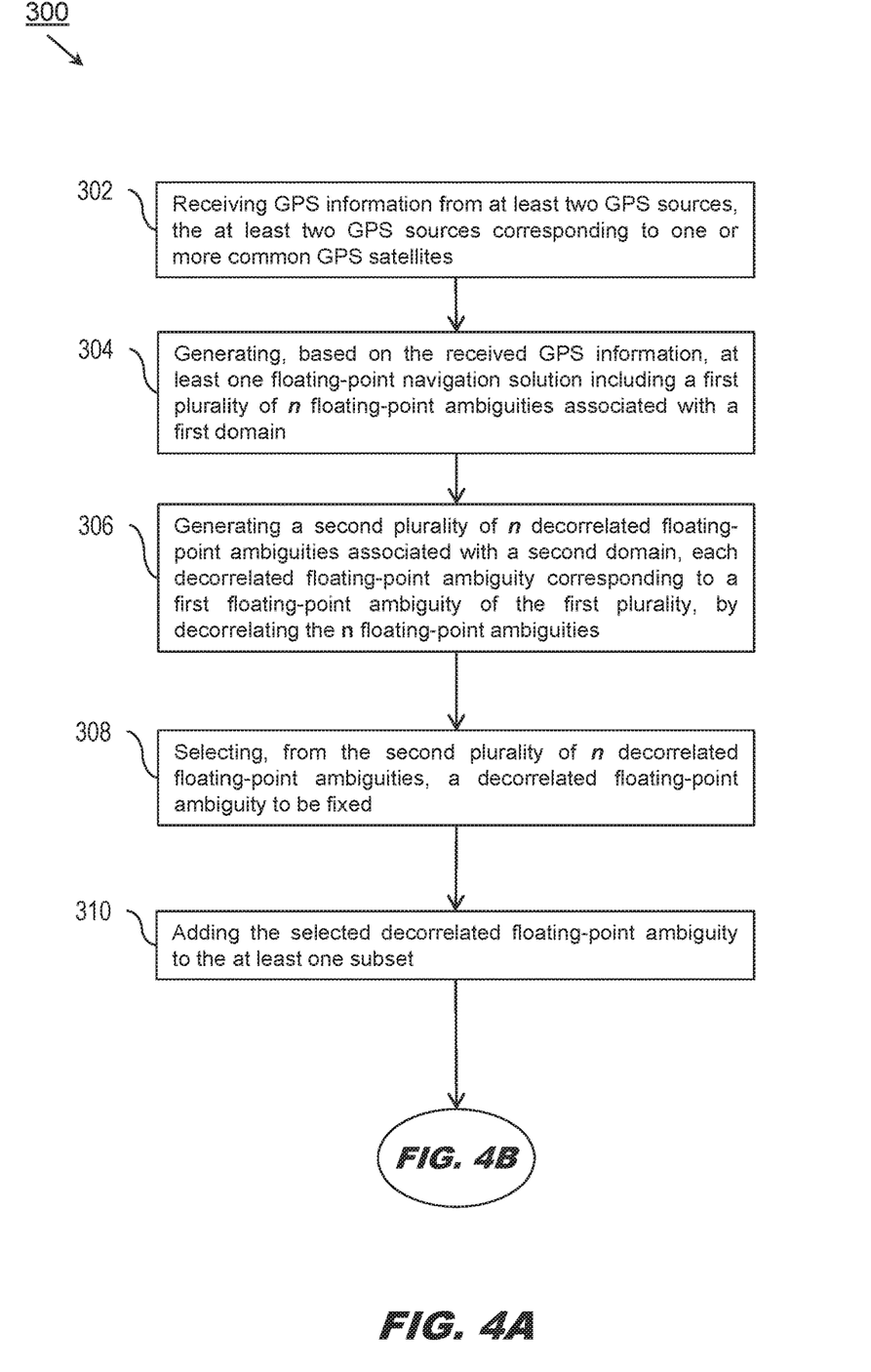
FIGS. 4A-4C are process flow diagrams illustrating a method according to embodiments of the inventive concepts disclosed herein.

Referring now to FIG. 4A, an exemplary embodiment of a method 300 for determining a precision navigation solution according to the inventive concepts disclosed herein may be implemented similarly to the method 200 of FIGS. 3A-3B, in that the steps 302 and 304 are implemented similarly to the steps 202 and 204 of the method 200.

At a step 306, the system 100 generates a set of n LAMBDA-domain floating-point ambiguities 116 corresponding to the set of n floating-point carrier phase ambiguities 112 by decorrelating the set of n floating-point carrier-phase ambiguities via LAMBDA algorithms. The system 100 may generate error covariances associated with the decorrelated LAMBDA-domain floating-point ambiguities 116. The system 100 may order the n decorrelated floating-point ambiguities 116, e.g., by descending PCF (the first decorrelated floating-point ambiguity 116a having the highest PCF, the second decorrelated floating-point ambiguity 116b having the next highest PCF, and so forth).

At a step 308, the system 100 selects from the set of n decorrelated LAMBDA-domain floating-point ambiguities 116 a single decorrelated LAMBDA-domain floating-point ambiguity 116a to be fixed. The system 100 may select the first decorrelated LAMBDA-domain floating-point ambiguity 116a having the highest PCF.

At a step 310, the system 100 adds the selected decorrelated LAMBDA-domain floating-point ambiguity 116a to a subset 122 of $n_f$ decorrelated LAMBDA-domain floating-point ambiguities.

Figure 4B:
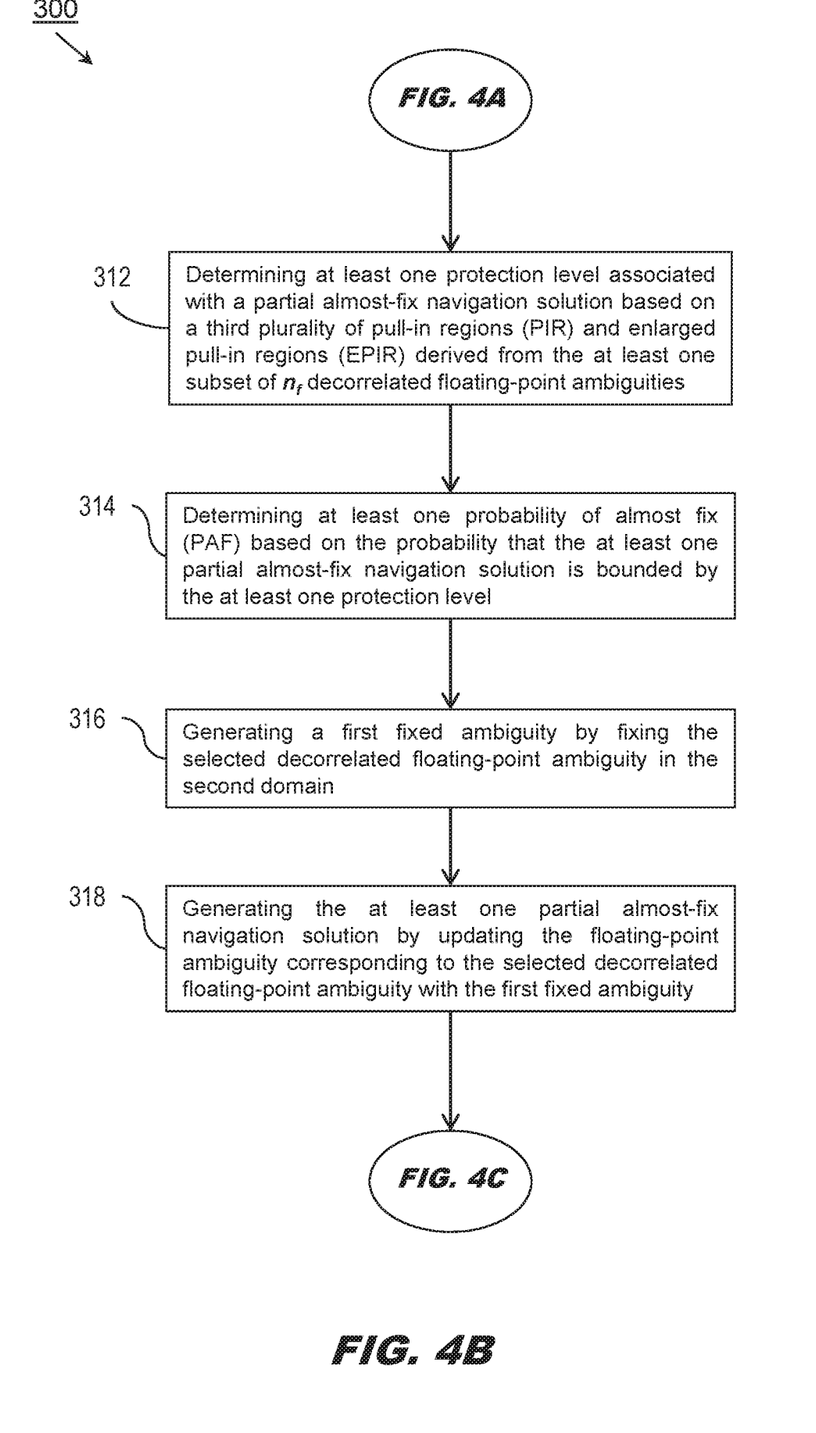

Referring to FIG. 4B, at a step 312, the system 100 determines protection levels associated with a partial almost-fix navigation solution 124 based on the probability that the partial almost-fix navigation solution 124 is derived from within a PIR of correctly fixed LAMBDA-domain fixed integer ambiguities 118 (e.g., having zero errors) or an EPIR of incorrect (e.g., unfixed, incorrectly fixed) LAMBDA-domain floating-point integer ambiguities 116 wherein the errors associated with the LAMBDA-domain floating-point integer ambiguities 116 are no more than a single cycle (or, in the alternative, multiple cycles). The EPIR may be narrowed to incorrectly fixed LAMBDA-domain floating-point integer ambiguities 116 involving errors of a single cycle or less.

At a step 314, the system 100 determines a PAF based on the probability that the partial almost-fix navigation solution 124 is bounded by the determined protection levels.

At a step 316, the system 100 generates a LAMBDA-domain fixed ambiguity 118b by fixing the selected decorrelated LAMBDA-domain floating-point ambiguity 116a in the LAMBDA domain.

At a step 318, the system 100 generates the partial almost-fix navigation solution 124 by updating the floating-point carrier-phase ambiguity 112a of the floating-point baseline navigation solution 114 and corresponding to the selected decorrelated LAMBDA-domain floating-point ambiguity 116a with the generated LAMBDA-domain fixed ambiguity 118b.

Figure 4C:
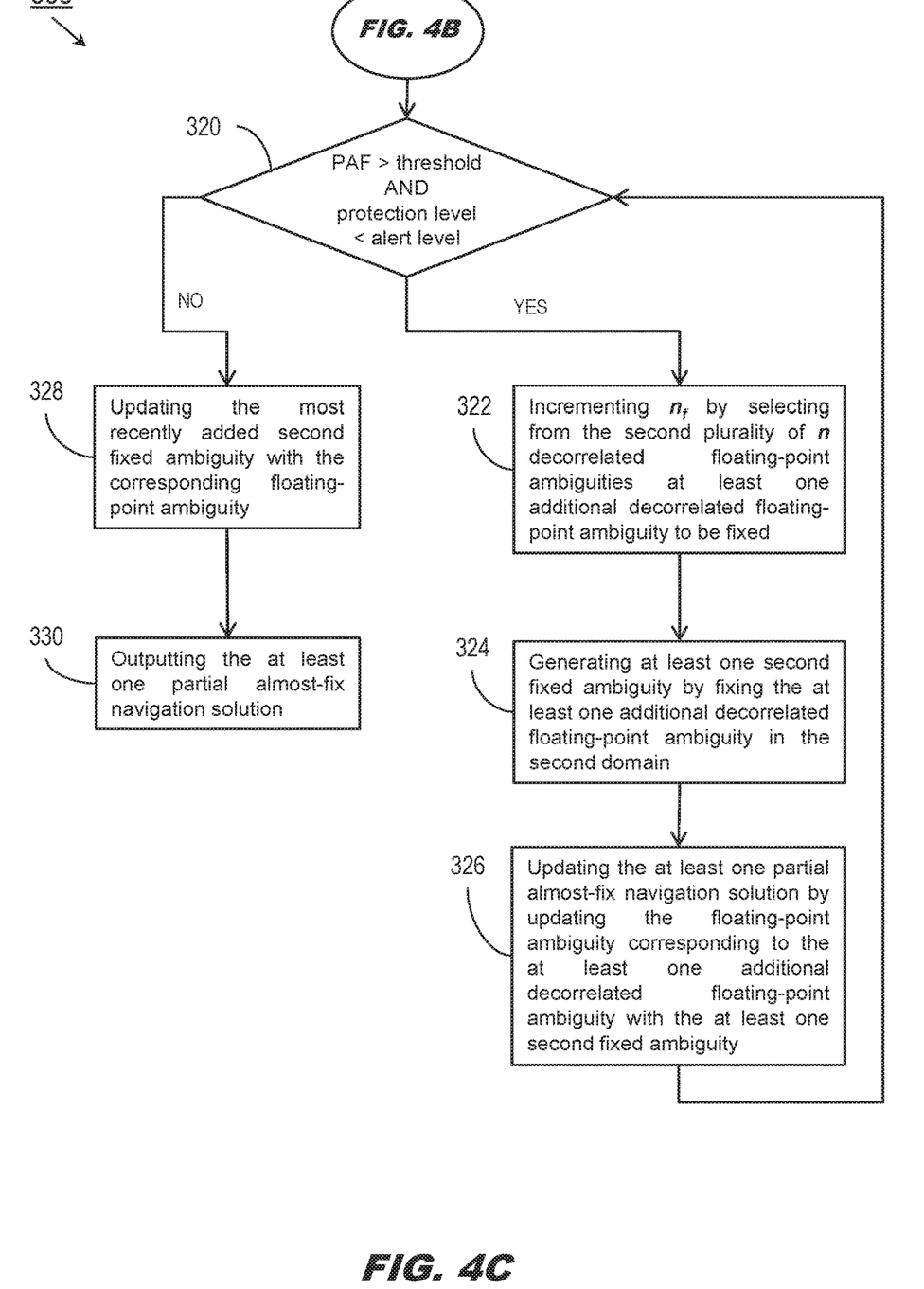

Referring to FIG. 4C, at a step 320, the system 100 determines whether the PAF is higher than a predetermined threshold and the determined protection levels are under predetermined alert limits.

While the PAF is above the threshold value and protection levels are under alert limits, at a step 322, the system 100 increments $n_f$ by selecting an additional decorrelated LAMBDA-domain floating-point ambiguity 116b to be fixed. For example, the system 100 may select the first unfixed decorrelated LAMBDA-domain floating-point ambiguity 116b (e.g., the unfixed decorrelated LAMBDA-domain floating-point ambiguity having the highest remaining PCF, or the $(n_f+1)$th decorrelated LAMBDA-domain floating-point ambiguity).

At a step 324, the system 100 generates an additional LAMBDA-domain fixed ambiguity 118c by fixing the selected decorrelated LAMBDA-domain floating-point ambiguity 116b in the LAMBDA domain.

At a step 326, the system 100 updates the partial almost-fix navigation solution (124b) by updating the floating-point carrier-phase ambiguity 112b of the partial almost-fix navigation solution and corresponding to the selected decorrelated LAMBDA-domain floating-point ambiguity 116b with the generated LAMBDA-domain fixed ambiguity 118c based on the selected decorrelated LAMBDA-domain floating-point ambiguity 116b.

If either the PAF drops below the threshold or the protection levels reach the alert limits, at a step 328 the system 100 updates the most recently added LAMBDA-domain fixed ambiguity 118d of the partial almost-fix navigation solution 124c with the corresponding floating-point carrier-phase ambiguity 112b that the most recently added fixed ambiguity 118d replaced.

At a step 330, the system 100 outputs the updated partial almost-fix navigation solution 124d. The output solution may be a full fixed ambiguity solution 120 (e.g., if $n_f=n$); the output solution may be the original floating-point baseline navigation solution 114 (e.g., if $n_f=0$).

As will be appreciated from the above, systems and methods according to embodiments of the inventive concepts disclosed herein may simplify the partial fixing process. As both the fixing of decorrelated floating-point ambiguities 116 and the corresponding update of the floating-point baseline navigation solution 114 with fixed ambiguities 118 are accomplished in the LAMBDA domain, the partial list of fixed integer ambiguities used to update the floating-point baseline navigation solution is straightforward. Similarly, as only the partial list of fixed integer ambiguities 118 is used to compute the PAF of the partial almost-fix navigation solution 124, high system integrity can be preserved within tighter protection levels compared to conventional GERAFS functionality.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A method for determining high-integrity navigational solutions, comprising:
receiving, via a processor, satellite-based navigation data from at least two satellite-based navigation sources associated with one or more common navigation satellites;
generating, via the processor, at least one plurality of floating-point ambiguities associated with a first domain based on the received satellite-based navigation data;
generating, via the processor, at least one baseline solution associated with a second domain by decorrelating the plurality of floating-point ambiguities in the second domain;
selecting, via the processor, a first decorrelated floating-point ambiguity to be fixed from the baseline solution;
determining, via the processor, at least one protection level associated with a partial almost-fix solution (PAFS);
determining, via the processor, at least one probability of almost fix (PAF) based on a probability that the PAFS is bounded by the protection level;
generating, via the processor, a first fixed ambiguity by fixing the first decorrelated floating-point ambiguity in the second domain;
generating, via the processor, the PAFS by substituting the floating-point ambiguity corresponding to the first decorrelated floating-point ambiguity with the first fixed ambiguity;
while the PAF is above a threshold and the protection level is below an alert level:
selecting, via the processor, at least one second decorrelated floating-point ambiguity to be fixed from the baseline solution;
generating, via the processor, at least one second fixed ambiguity by fixing the second decorrelated floating-point ambiguity in the second domain;
and
updating the PAFS by substituting, via the processor, the floating-point ambiguity corresponding to the second decorrelated floating-point ambiguity with the corresponding second fixed ambiguity;
and
if the PAF is not below the threshold or the protection level is not above the alert level:
updating the PAFS by substituting, via the processor the most recently added second fixed ambiguity with the corresponding floating-point ambiguity;
and
outputting the updated PAFS.

2. The method of claim 1, wherein the processor is embodied in a first mobile platform and receiving, via a processor, satellite-based navigation data from at least two satellite-based navigation sources associated with one or more common navigation satellites includes:
receiving first navigation data from a satellite-based receiver associated with the first mobile platform;
and
receiving second navigation data from a second mobile platform proximate to the first mobile platform.

3. The method of claim 1, wherein generating, via the processor, at least one baseline solution associated with a second domain by decorrelating the plurality of floating-point ambiguities in the second domain includes:
generating at least one baseline solution associated with a Least-squares AMBiguity Decorrelation Adjustment (LAMBDA) domain by decorrelating the plurality of floating-point ambiguities according to at least one LAMBDA algorithm.

4. The method of claim 1, wherein generating, via the processor, at least one baseline solution associated with a second domain by decorrelating the plurality of floating-point ambiguities in the second domain includes:
generating an ordered sequence of decorrelated floating-point ambiguities by decorrelating the plurality of floating-point ambiguities in the second domain.

5. The method of claim 4, wherein:
generating an ordered sequence of decorrelated floating-point ambiguities includes generating an ordered sequence of decorrelated floating-point ambiguities based on Probability of Correct Fix (PCF);
selecting, via the processor, a first decorrelated floating-point ambiguity to be fixed from the baseline solution includes selecting the decorrelated floating-point ambiguity having the highest PCF;
and
selecting, via the processor, at least one second decorrelated floating-point ambiguity to be fixed from the baseline solution includes selecting the decorrelated floating-point ambiguity having the highest PCF.

6. The method of claim 1, wherein determining, via the processor, at least one protection level associated with a partial almost-fix solution (PAFS) includes:
determining the at least one protection level based on a plurality of pull-in regions (PIR) and enlarged pull-in regions (EPIR) derived from the selected decorrelated floating-point ambiguities to be fixed.

7. The method of claim 6, wherein determining the at least one protection level based on a plurality of pull-in regions Amendments and Response to the Office Action of Dec. 10, 2020 (PIR) and enlarged pull-in regions (EPIR) derived from the selected decorrelated floating-point ambiguities to be fixed includes:
determining the at least one protection level based on a plurality of correctly fixed integer ambiguities and incorrectly fixed floating-point ambiguities associated with an error of no more than a single cycle.

* * * * *